(12) United States Patent
Lee

(10) Patent No.: US 8,571,234 B2
(45) Date of Patent: *Oct. 29, 2013

(54) DISPLAY DEVICE AND DRIVING METHOD THEREOF

(75) Inventor: Ji-Yoon Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 586 days.

This patent is subject to a terminal disclaimer.

(21) Appl. No.: 12/626,706

(22) Filed: Nov. 27, 2009

(65) Prior Publication Data

US 2010/0309374 A1    Dec. 9, 2010

(30) Foreign Application Priority Data

Jun. 8, 2009    (KR) ................. 10-2009-0050484

(51) Int. Cl.
- *H03G 3/00* (2006.01)
- *H04R 5/02* (2006.01)
- *G06K 9/46* (2006.01)
- *G06K 9/66* (2006.01)
- *G06F 3/038* (2006.01)

(52) U.S. Cl.
USPC ........... 381/107; 381/104; 381/306; 382/194; 345/204

(58) Field of Classification Search
USPC ............. 382/194; 381/107, 306, 58, 104, 56; 345/204; 700/94
See application file for complete search history.

(56) References Cited

FOREIGN PATENT DOCUMENTS

| JP | 04-014084 | 1/1992 |
| JP | 05-002483 | 1/1993 |
| JP | 06-118922 | 4/1994 |
| JP | 2000-115649 | 4/2000 |
| JP | 2003-131659 | 5/2003 |
| JP | 2003-271164 | 9/2003 |

(Continued)

OTHER PUBLICATIONS

Translation of JP 2003-131659 from PAJ website, Jun. 3, 2012.*

(Continued)

*Primary Examiner* — Vivian Chin
*Assistant Examiner* — Douglas Suthers
(74) *Attorney, Agent, or Firm* — Christie, Parker & Hale, LLP

(57) ABSTRACT

A display device and a driving method thereof where different sounds are output depending upon characteristics of display images. The display device includes a display unit having a plurality of pixels, a signal controller, and a sound controller. The display unit displays images by selectively activating pixels from among the plurality of pixels in accordance with input video signals and input image control signals. The signal controller reads the input video signals to generate on-pixel signals having information about a ratio of a number of the activated pixels compared to a total number of pixels in the plurality of pixels per each frame and generating a sound output start signal. The sound controller determines a range from among predetermined ratio ranges corresponding to the ratio of the number of active pixels to define a plurality of volume levels, and determining the volume level corresponding to the on-pixel signal so as to generate a sound output instruction signal corresponding to the determined volume level.

16 Claims, 3 Drawing Sheets

(56) References Cited

FOREIGN PATENT DOCUMENTS

| | | |
|---|---|---|
| JP | 2007-134930 | 5/2007 |
| JP | 2007-147731 | 6/2007 |
| JP | 2007-148064 | 6/2007 |
| JP | 2008-009443 | 1/2008 |
| JP | 2008-170970 | 7/2008 |
| JP | 2008-233830 | 10/2008 |
| JP | 2008-293042 | 12/2008 |
| KR | 10-1997-0000601 | 1/1997 |
| KR | 10-1997-0025046 | 5/1997 |

OTHER PUBLICATIONS

Definition of Luminosity excerpt from merriam-webster.com, "http://www.merriam-webster.com/dictionary/luminosity", 1 page, captured Nov. 29, 2012.*
U.S. Appl. No. 12/622,635, filed Nov. 20, 2009, Ji-Yoon Lee, Samsung Mobile Display Co., Ltd.
U.S. Office action dated Jun. 11, 2012, for cross reference U.S. Appl. No. 12/622,635, (23 pages).
U.S. Office action dated Dec. 5, 2012, for cross reference U.S. Appl. No. 12/622,635, (13 pages).

* cited by examiner

DISPLAY DEVICE AND DRIVING METHOD THEREOF

CROSS-REFERENCE TO RELATED APPLICATION

This application claims the benefit of Korean Patent Application No. 10-2009-0050484, filed Jun. 8, 2009, in the Korean Intellectual Property Office, the disclosure of which is incorporated herein by reference.

BACKGROUND OF THE INVENTION

1. Field of the Invention

Aspects of the present invention relate generally to a display device and a driving method thereof, and more particularly, to an organic light emitting diode (OLED) display and a method of driving the same.

2. Description of the Related Art

A display device has a display area including a plurality of pixels arranged on a substrate in the form of a matrix and scan and data lines connected to the respective pixels. Data signals are selectively applied to the pixels to display desired images. The display devices are classified into passive and active matrix types, depending upon the method of driving the pixels. With consideration to resolution, contrast, and response time, the trend is towards using the active matrix type display device where the respective unit pixels are selectively turned on or off.

The display device is used as a display unit for a personal computer, a portable phone, a PDA, and other mobile information devices, or as a monitor for various kinds of information systems or other similar devices. A liquid crystal panel-based LCD, an organic light emitting diode (OLED) display, a plasma panel-based PDP, or other similar displays, are well known.

Various kinds of emissive display devices, which are smaller and weigh less than CRTs, have been recently developed, and particularly, the organic light emitting diode display has come to the forefront because it provides improved in emissive efficiency, luminance, and viewing angle, and has a short response time.

However, a problem with such display devices is that when still images such as photographs are displayed without any sound or audio information, they user experience in viewing such photographs may be diminished.

The above information disclosed in this Background section is only for enhancement of invention understanding of the background of the described technology and therefore it may contain information that does not form the prior art that is already known in this country to a person of ordinary skill in the art.

SUMMARY OF THE INVENTION

Aspects of the present invention provide a display device and a driving method thereof having advantages of outputting different sounds depending upon characteristics of display images.

Aspects of the present invention provide a display device including a display unit having a plurality of pixels, a signal controller, and a sound controller. The display unit displays images by selectively activating pixels from among the plurality of pixels in accordance with input video signals and input image control signals. The signal controller reads the input video signals to generate on-pixel signals having information about a ratio of a number of the active pixels compared to a total number of pixels in the plurality of pixels per each frame and generating a sound output start signal. The sound controller determines a range from among predetermined ratio ranges corresponding to the ratio of the number of active pixels to define a plurality of volume levels, and determining the volume level corresponding to the on-pixel signal to generate a sound output instruction signal corresponding to the determined volume level. The input image control signals include a vertical synchronization signal, and the signal controller generates the sound output start signal in synchronization with the vertical synchronization signal. A sound output unit outputs the sound corresponding to the sound output instruction signal in accordance with the sound output start signal. The sound controller generates a plurality of sound output instruction signals to output different sounds corresponding to the plurality of steps, respectively. One of the plurality of sound output instruction signals is a signal instructing to output no sound.

Aspects of the present invention provide a method of driving a display device such that a plurality of pixels are selectively activated in accordance with input video signals and input image control signals to display images. The input video signals are read so as to generate on-pixel signals having information about a ratio of the number of active pixels to a total number of pixels in the plurality of pixels per each frame. A range from among predetermined ratio ranges is determined to correspond to the ratio of the number of activate pixels to define a plurality of volume levels. The volume level corresponding to the on-pixel signal is determined, and a sound output instruction signal corresponding to the determined volume level is generated. The input image control signals include a vertical synchronization signal and a sound output start signal is generated in synchronization with the vertical synchronization signal. A sound corresponding to the sound output instruction signal is output in accordance with the sound output start signal.

According to aspects of the present invention, different sounds may be output depending upon the characteristics of the display images.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
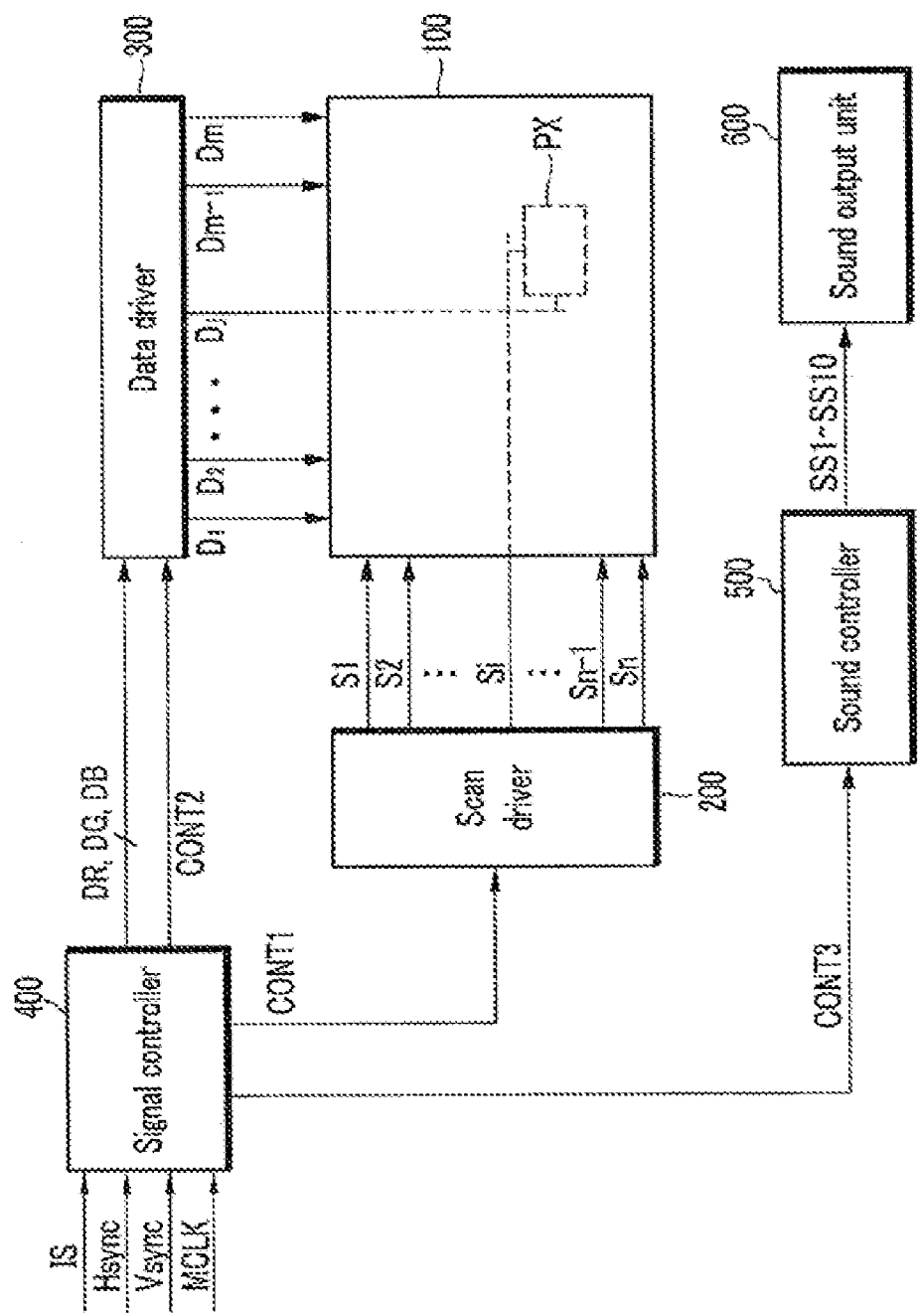
FIG. 1 is a block diagram of a display device according to an exemplary embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Herein, when a first element is described as being connected to a second element, the first element may be directly connected to the second element or may be electrically connected or indirectly connected to the second element via a third element.

Figure 2:
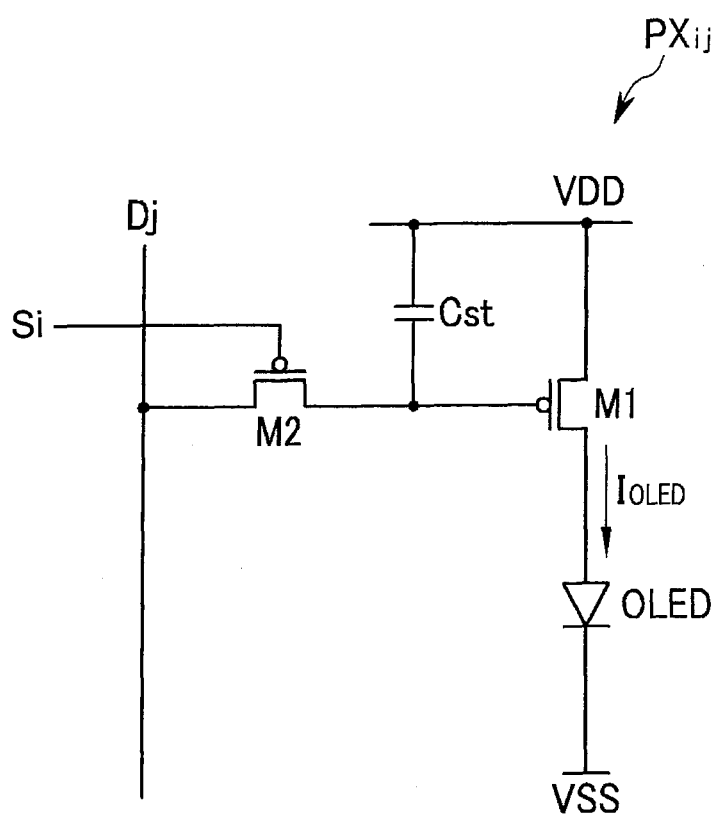
FIG. 2 is an equivalent circuit diagram of the pixel PX shown in FIG. 1.

FIG. 1 is a block diagram of a display device according to an exemplary embodiment, and FIG. 2 is an equivalent circuit diagram of the pixel PX shown in FIG. 1.

Referring to FIG. 1, a display device according to an exemplary embodiment includes a display unit 100, a scan driver 200, a data driver 300, a signal controller 400, a sound controller 500, and a sound output unit 600. From the viewpoint of an equivalent circuit, the display unit 100 includes a plurality of signal lines S1 to Sn and D1 to Dm, and a plurality of pixels PX connected to those signal lines and arranged roughly in the form of a matrix. The signal lines S1 to Sn and D1 to Dm include a plurality of scan lines S1 to Sn for transmitting scan signals, and a plurality of data lines D1 to Dm for transmitting data voltages. The scan lines S1 to Sn extend roughly in the pixel row direction while standing substantially parallel to each other, and the data lines D1 to Dm extend roughly in the pixel column direction while standing substantially parallel to each other.

Referring to FIG. 2, each pixel PX, for example the pixel PXij connected to the i-th (i=1, 2, ..., n) scan line Si and the j-th (j=1, 2, ..., m) data line Dj, includes an organic light emitting element OLED, a driving transistor M1, a capacitor Cst, and a switching transistor M2.

The driving transistor M1 has a control terminal, an input terminal, and an output terminal. The control terminal of the driving transistor M1 is connected to the switching transistor M2, while the input terminal of the driving transistor M1 is connected to a driving voltage VDD and the output terminal of the driving transistor M1 is connected to the organic light emitting element OLED. The driving transistor M1 outflows an electric current IOLED of varying amplitude according to the voltages held between the control and output terminals.

The switching transistor M2 has a control terminal, an input terminal, and an output terminal. The control terminal of the switching transistor M2 is connected to the scan line Si, while the input terminal the switching transistor M2 is connected to the data line Dj and the output terminal the switching transistor M2 is connected to the driving transistor M1. The switching transistor M2 transmits a data signal, that is, a data voltage, from the data line Dj in response to the scan signal applied to the scan line Si.

The capacitor Cst is connected between the control and input terminals of the driving transistor M1. The capacitor Cst is charged by and stores the data voltage applied to the control terminal of the driving transistor M1.

The organic light emitting element OLED, which may be an organic light emitting diode (OLED), has an anode connected to the output terminal of the driving transistor M1 and a cathode connected to a common voltage VSS. The organic light emitting element OLED emits light of varying intensity according to the electric current IOLED supplied from the driving transistor M1 so as to display an image.

The organic light emitting element OLED may emit light of one of the primary colors red, green, and blue, and the desired color may be expressed by a spatial or temporal sum of the three primary colors. Some of the organic light emitting element OLED may emit light of a white color so as to heighten the luminance. Alternatively, the organic light emitting elements OLED of each of the respective pixels PX may emit light of a white color, and in this case, some of the pixels PX of the display unit 100 may further include a color filter (not shown) for converting the white-colored light from the organic light emitting elements OLED into any one of the primary colors.

The driving transistor M1 and the switching transistor M2 are p-channel field effect transistors (FET). In this case, the control terminal, the input terminal, and the output terminal correspond to the gate, the source, and the drain, respectively. However, at least one of the switching transistor M2 and the driving transistor M1 may be an n-channel field effect transistor. Furthermore, the transistors M1 and M2, the capacitor Cst, and the organic light emitting element OLED may be changed in interconnection. The pixel PXij shown in FIG. 2 illustrates a pixel of a display device, and another pixel having a different structure with at least two transistors or at least one capacitor may be used instead.

Referring to FIG. 1 again, the scan driver 200 is connected to the scan lines S1 to Sn of the display unit 100, and sequentially applies scan signals to the scan lines S1 to Sn in accordance with the scan control signals CONT1. The scan signals include a gate-on voltage Von (not shown) for turning on the switching transistor M2, and a gate-off voltage Voff (not shown) for turning off the switching transistor M2. When the switching transistor M2 is a p-channel field effect transistor, the gate-on voltage Von and the gate-off voltage Voff are low and high voltages, respectively.

The data driver 300 is connected to the data lines D1 to Dm of the display unit 100 and converts the data signals DR, DG, and DB input from the signal controller 400 into data voltages in accordance with the data control signals CONT2 so as to apply them to the data lines D1 to Dm.

The signal controller 400 receives input signals IS, horizontal synchronization signals Hsync, vertical synchronization signals Vsync, and main clock signals MCLK from the outside, and generates image data signals DR, DG, and DB, scan control signals CONT1, data control signals CONT2, and sound control signals CONT3. The scan control signals CONT1 include a scan start signal STV, and at least one clock signal for controlling the output cycle of the gate on voltage Von. The scan control signals CONT1 may further include an output enable signal OE for defining the duration time of the gate on voltage Von. The data control signals CONT2 include horizontal synchronization start signals STH for starting the transmission of image data signals DR, DG, and DB with respect to a row of pixels PX to the data driver 300, and load signals LOAD for applying data voltages to the data lines D1 to Dm. The sound control signals CONT3, according to an exemplary embodiment, include sound output start signals (SOUT) for instructing to output the sound in synchronization with the vertical synchronization signals Vsync, and on-pixel signals (OPS) containing information about the number of turned-on pixels within one frame. The on-pixel signal (OPS) represents a percent ratio of the number of turned-on pixels compared to the total number of pixels PX in the display unit 100. For example, when the total number of pixels in the display unit 100 is 100, the on-pixel signal (OPS) represents a percent ratio of 10% when the number of turned-on pixels within one frame is 10.

The sound controller 500 defines a plurality of ranges for the ratio of the number of turned-on pixels PX compared to the total number of the pixels level by level, and detects the level corresponding to the ratio of on-pixel signals (OPS). The sound controller 500 generates a plurality of sound output instruction signals SS1 to SS10 such that they correspond to the detected levels. In the present exemplary embodiment, the sound controller 500 defines the levels corresponding to the ratios of the turned-on pixels PX to all of the pixels PX by the unit of 10%. That is, a first level is made when the ratio of the turned-on pixels PX to all of the pixels PX ranges from 0% to less than 10%, and a second step is made when the ratio of the turned-on pixels PX to all of the pixels PX ranges from 10% to less than 20%. Similarly, a tenth step is made when the ratio of the turned-on pixels PX to all of the pixels PX ranges from 90% to 100%. In this way, the ratio of the turned-on pixels PX to all of the pixels PX is demarcated in range step by step. The embodiment is not limited thereto, and the ratio range of the turned-on pixels may increase or decrease per the respective steps. For example, when the ratio of the turned-on pixels PX to all of the pixels PX is defined by the unit of 20%, five steps are made. The plurality of sound output instruction signals SS1 to SS10 are signals that correspond to the first to tenth steps, respectively, and make different sounds including no sound output.

The sound output unit 600 outputs a sound corresponding to the sound output instruction signal selected from the plurality of sound output instruction signals SS1 to SS10 in accordance with the sound output start signal (SOUT).

Figure 3:
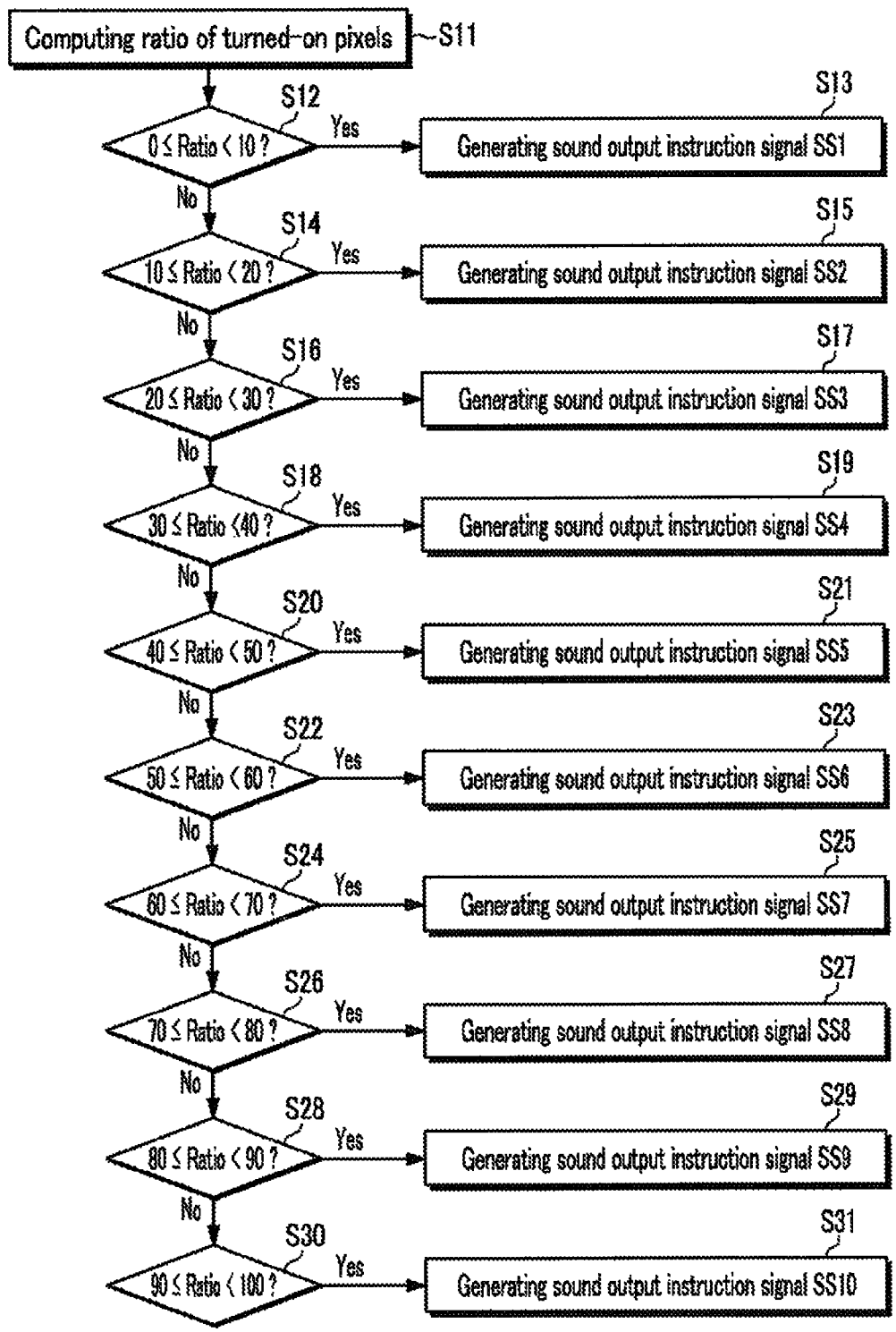
FIG. 3 is a flowchart illustrating a method of driving a display device according to an exemplary embodiment.

FIG. 3 is a flowchart illustrating a method of driving a display device according to an exemplary embodiment.

Referring to FIG. 3, the signal controller 400 detects the number of turned-on pixels PX from the input signals IS per each frame, and computes the ratio of the turned-on pixels PX to all of the pixels PX, with a first step S11. The computed ratio is output by the on-pixel signal (OPS). Thereafter, the sound controller 500 detects the step coinciding with the ratio computed at the first step S11. Specifically, the sound controller 500 judges whether the ratio computed at the first step S11 is in the range of 0% to less than 10%, with a second step S12. When it is judged that the ratio computed at the first step S11 is in that range, the sound controller 500 generates a first sound output instruction signal SS1, with a third step S13. When the ratio computed at the first step S11 is not in that range, a fourth step S14 is made. The sound controller 500 judges with the fourth step S14 whether the ratio computed at the first step S11 is in the range of 10% to less than 20%. When it is judged that the ratio computed at the first step S11 is in that range, the sound controller 500 generates a second sound output instruction signal SS2, with a fifth step S15. When the ratio computed at the first step S11 is not in that range, a sixth step S16 is made. This process is conducted repeatedly. Finally, the sound controller 500 judges with a twentieth step S30 whether the ratio computed at the first step S11 is in the range of 90% to 100%. When it is judged that the ratio computed at the first step S11 is in that range, the sound controller 500 generates a tenth sound output instruction signal SS10, with a twenty-first step S31.

As described above, with a display device and a driving method thereof according to an exemplary embodiment, different sounds are output in accordance with the ratio of the turned-on pixels computed from the video signals per each frame so that the sounds corresponding to the characteristics of the display images can be heard. Furthermore, the sounds may be diversified in kind by controlling the range of demarcating the ratio of turned-on pixels.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display device comprising:
    a display unit having a plurality of pixels to display images by selectively activating ones of the pixels in accordance with input video signals and input image control signals;
    a signal controller for reading the input video signals to generate an on-pixel signal having information about a ratio of a number of the active pixels to a total number of the pixels per each frame, and to generate a sound output start signal; and
    a sound controller for determining a ratio range from among first ratio ranges corresponding to the ratio of the number of the active pixels to the total number of the pixels and defining a plurality of kinds of sound, and determining one of the kinds corresponding to the on-pixel signal to generate a sound output instruction signal corresponding to the determined kind,
    wherein the input image control signals comprise a vertical synchronization signal, and the signal controller is configured to generate the sound output start signal in synchronization with the vertical synchronization signal.

2. The display device of claim 1 further comprising a sound output unit for outputting a sound corresponding to the sound output instruction signal in accordance with the sound output start signal.

3. The display device of claim 1, wherein the sound output instruction signal comprises a plurality of sound output instruction signals to generate different output sounds corresponding to the plurality of kinds.

4. The display device of claim 3, wherein one of the plurality of sound output instruction signals is a signal to generate no output sound.

5. A method of driving a display device, the method comprising:
    selectively activating a plurality of pixels to display images in accordance with input video signals and input image control signals;
    reading the input video signals to generate an on-pixel signal having information about a ratio of a number of the active pixels to a total number of the pixels per each frame;
    determining a ratio range from among first ratio ranges corresponding to the ratio of the number of the active pixels to the total number of the pixels and defining a plurality of kinds of sound;
    determining one of the kinds corresponding to the on-pixel signal; and
    generating a sound output instruction signal corresponding to the determined kind,
    wherein the input image control signals comprise a vertical synchronization signal, and the reading of the input video signals is further to generate a sound output start signal in synchronization with the vertical synchronization signal.

6. The method of claim 5 further comprising outputting a sound corresponding to the sound output instruction signal in accordance with the sound output start signal.

7. A display device including a display unit having a plurality of pixels to display images according to input video signals and input image control signals, the display device comprising:
    a signal controller for determining a number of activated pixels per each frame displayed on the display unit from among the plurality of pixels according to the input video signals, and generating a sound output start signal; and
    a sound controller for generating a sound output instruction signal according to the number of activated pixels and controlling a sound of the display device according to the sound output instruction signal,
    wherein the input image control signals comprise a vertical synchronization control signal, and the signal controller is configured to generate the sound output start signal in synchronization with the vertical synchronization signal.

8. The display device of claim 7, wherein the signal controller is configured to calculate an on-pixel ratio of the number of activated pixels per each frame compared to a total number of the plurality of pixels.

9. The display device of claim 8, wherein the sound controller is configured to receive the on-pixel ratio from the signal controller to generate the sound output instruction signal to control the sound of the display device.

10. A display device including a display unit having a plurality of pixels to display images according to input video signals and input image control signals, the display device comprising:
   a signal controller for determining a number of activated pixels per each frame displayed on the display unit from among the plurality of pixels according to the input video signals, and generating a sound output start signal; and
   a sound controller for generating a sound output instruction signal according to the number of activated pixels and controlling a sound of the display device according to the sound output instruction signal,
   wherein the sound comprises a plurality of sounds according to first ranges corresponding to the number of activated pixels per each frame.

11. The display device of claim 10, wherein the sound controller is configured to maintain controlling a first one of the sounds corresponding to a first one of the first ranges according to the sound output instruction signal until the sound controller generates another sound output instruction signal to control a second one of the sounds corresponding to a second one of the first ranges.

12. The display device of claim 10, further comprising a sound output unit for outputting the sound corresponding to the sound output instruction signal in accordance with the sound output start signal.

13. A method of controlling a sound of a display device, comprising:
   determining a number of activated pixels for a frame displayed on a display unit of the display device according to input video signals;
   generating a sound output instruction signal according to the number of activated pixels; and
   controlling the sound of the display device according to the sound output instruction signal,
   wherein the determining of the number of activated pixels comprises calculating an on-pixel ratio of the number of activated pixels for the frame compared to a total number of pixels of the display unit.

14. The method of claim 13, wherein the sound comprises a plurality of sounds according to first ranges corresponding to the number of activated pixels for the frame and the generating of the sound output instruction signal comprises determining one of the sounds corresponding to the calculated on-pixel ratio to generate the sound output instruction signal.

15. The method of claim 14, further comprising:
   maintaining the controlling of the one of the sounds corresponding to a first one of the first ranges until generating another sound output control signal for controlling a second one of the sounds corresponding to a second one of the first ranges.

16. A method of controlling a sound of a display device, comprising:
   determining a number of activated pixels for a frame displayed on a display unit of the display device according to input video signals;
   generating a sound output instruction signal according to the number of activated pixels; and
   controlling the sound of the display device according to the sound output instruction signal,
   further comprising outputting the sound corresponding to the sound output instruction signal in accordance with a sound output start signal.

\* \* \* \* \*